Nov. 23, 1926. Re. 16,481

O. C. FANSLER

RAIL JOINT PLATE

Original Filed August 12, 1925

Inventor

O. C. Fansler

By Eccleston & Eccleston

Attorneys

Reissued Nov. 23, 1926.

Re. 16,481

UNITED STATES PATENT OFFICE.

OLIVER C. FANSLER, OF GASSAWAY, WEST VIRGINIA.

RAIL-JOINT PLATE.

Original No. 1,567,583, dated December 29, 1925, Serial No. 49,800, filed August 12, 1925. Application for reissue filed September 3, 1926. Serial No. 133,497.

This invention relates to rail joints for railroad tracks and has reference to a base plate which may be positioned across two ties so as to support the abutting ends of the rails as well as the angle bars which unite them.

Another object of the invention resides in the construction of a base plate which may be positioned so as to give a slight elevation to the rail, when used on curves, without in any way mutilating the surface of the tie.

A further object of the invention consists in the provision of a base plate having an overhanging flange adjacent one edge thereof which is adapted to engage the outer angle bar to assist in preventing spreading or tilting of the rails as well as to maintain alignment of the abutting rail ends.

Another object of the invention is to provide a base plate which is interchangeable, that is to say, one which may be employed in conjunction with rails of varying sizes such as 60 pound rails, 80 pound rails, etc.

Other objects and advantages of the invention will be apparent from the following description when taken in connection with the accompanying drawings, in which.

Figure 1:
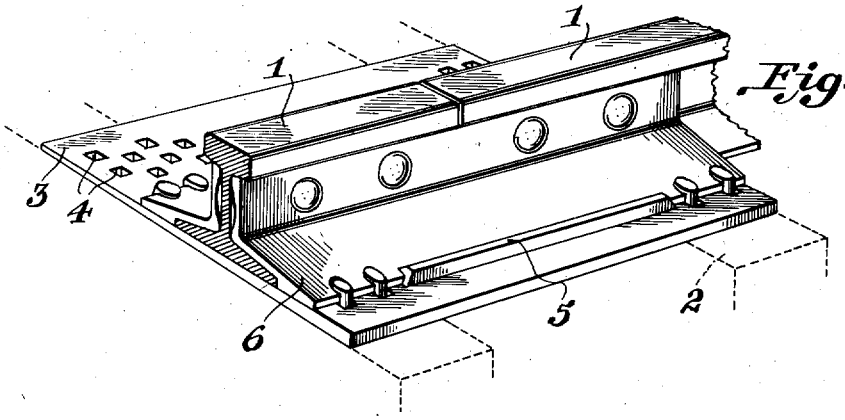
Figure 1 is a perspective view of the rail joint.
Figure 2:
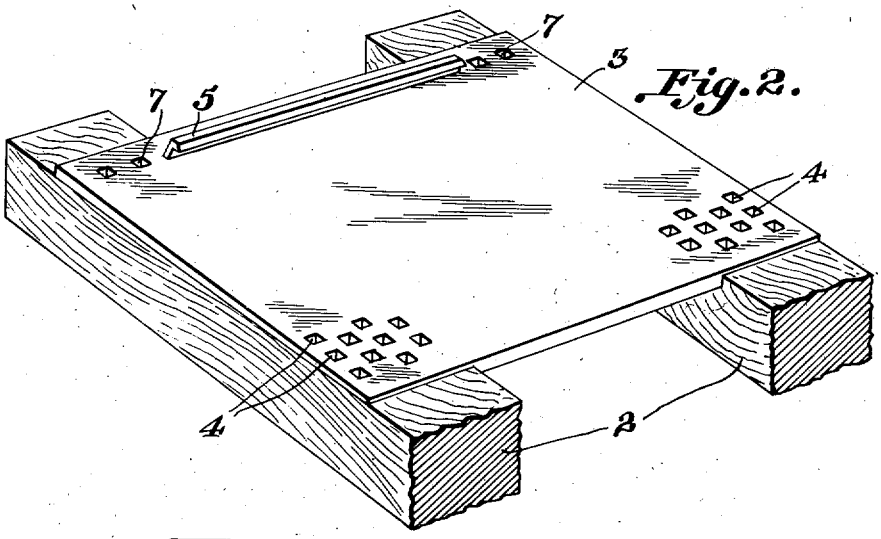
Figure 2 is a perspective view of the base plate per se.
Figure 3:
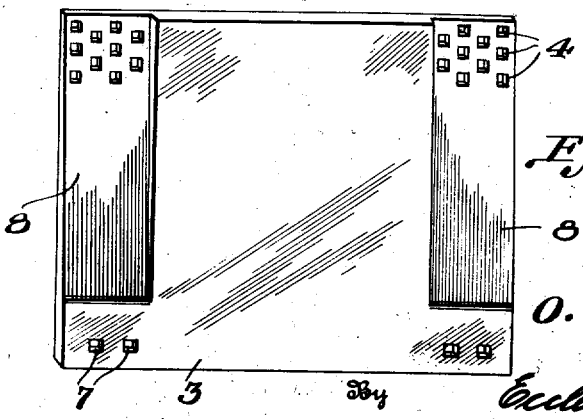
Figure 3 is a perspective view of the base plate from a different angle.

Referring to the drawings more in detail the numeral 1 indicates the rails which are united by the rail joint about to be described, and 2 refers to the usual cross-ties.

The essential feature of the present invention resides in the provision of the novel base plate which is indicated generally by the numeral 3. This plate is intended for use with rails of all standard sizes and to this end is provided with the specially arranged spike holes 4 which allow for the varying widths of the rail bases. Arranged adjacent the opposite edge of the base plate is an overhanging flange or abutment 5 which is adapted to engage the outer angle bar 6 of the rail joint so as to prevent either tilting or spreading of the rails. This edge of the base plate is also provided with spike holes 7 for securing the same to the ties.

It is well understood by those skilled in the art that cross-ties rot much more quickly when partly cut away in the manner usually followed where curves are under construction or repair. Under these circumstances the ties are usually cut away somewhat to give a tilt to the rail in the proper direction; this permits the ties to hold water at these points and causes a rapid deterioration of the ties. To avoid this objection I have provided the base plate 1 with the two bevels or inclined surfaces 8 at each end thereof for receiving the two ties by which the rail joint is supported. Obviously, this construction will give the necessary inclination to the base plate without any mutilation whatever to the surface of the tie. It should be noted that these inclined surfaces do not extend entirely across the base plate but on the contrary they terminate at a substantial distance from the thicker edge of the plate, this plain portion of the plate thus acting as a bearing and preventing the plate from cutting into the upper surface of the tie.

From the foregoing description taken in connection with the accompanying drawings it will be apparent that I have devised a novel form of base plate for rail joints which may be employed at curves without necessitating the mutilation of the cross-ties, and one which may be employed with varying sizes of rails.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A support for rails including a base plate, said base plate adapted to span the ties, the portion of the base plate resting on the ties being beveled to give an inclined surface to said plate, and the portion of the base plate between the ties functioning as a spacer member.

2. A support for rails including a base plate having beveled under surfaces adapted to rest on ties, and having a central portion of uniform thickness between the ties.

3. A support for rails including a base plate, said base plate adapted to span the ties, portions of said base plate being beveled which are adapted to rest on the ties, an overhanging flange on the top of said plate adjacent one edge thereof and said base plate having a plurality of spike holes adjacent the other edge thereof, said spike holes being arranged at different distances from the edge of said base plate.

4. A rail joint including a base plate, said base plate adapted to span the ties, the portion of the base plate resting on the ties being beveled to give an inclined surface to said plate, the portion of the base plate between the ties functioning as a spacer member, an overhanging flange on the top of said base plate adjacent one edge thereof, an angle bar connecting the rails and having a portion thereof adapted to fit under said overhanging flange, said base plate having a plurality of spike holes adjacent the other edge thereof, said spike holes being arranged at different distances from the edge of said base plate, whereby the rail joint is adapted to different sized rails.

5. In a support for rail joints, including a base plate adapted to span the ties, the portion of the base plate between the ties having greater thickness than the portions resting on the ties, and shoulders formed by said thickened portion whereby said thickened portion also functions as a spacer member, a single flange on the top of the base plate adjacent one side thereof, whereby the rail joint plate is rendered interchangeable with different size rails, said flange adapted to abut the edge of a conventional angle bar.

6. A support for rail joint including a base plate adapted to span the ties, the portion of the base plate between the ties being thickened and functioning as a spacer member, a flange on the top of said plate adjacent one edge thereof adapted to abut the edge of a conventional angle bar and said base plate having a plurality of spike holes adjacent the other edge thereof, said spike holes being arranged at different distances from the edge of said base plate.

7. A support for rails including a base plate adapted to span the ties, the portions of the base plate resting on the ties having less thickness than the portion which spans the ties, whereby downwardly extending shoulders are formed, an overhanging flange on the top of said base plate adjacent one edge thereof, an angle bar connecting the rails and having a portion thereof adapted to fit under said overhanging flange, said base plate having a plurality of spike holes adjacent the other edge thereof, said spike holes being arranged at different distances from the edge of the said base plate, whereby the rail joint is adapted to different sized rails.

OLIVER C. FANSLER.